United States Patent
Murdoch et al.

(10) Patent No.: US 6,226,730 B1
(45) Date of Patent: May 1, 2001

(54) ACHIEVING PAGE HIT MEMORY CYCLES ON A VIRTUAL ADDRESS REFERENCE

(75) Inventors: Robert N. Murdoch, deceased, late of Sacramento, by Leslie Raderman, executor; Michael W. Williams, Citrus Heights, both of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/092,426

(22) Filed: Jun. 5, 1998

(51) Int. Cl.[7] ........................................ G06F 12/10
(52) U.S. Cl. ................. 711/203; 711/200; 711/205; 711/206
(58) Field of Search .......................... 711/2, 105, 154, 711/200, 203, 205, 206, 219, 220, 221

(56) References Cited

U.S. PATENT DOCUMENTS

| | | | |
|---|---|---|---|
| 5,465,337 | * 11/1995 | Kong ................................... | 711/207 |
| 5,475,827 | * 12/1995 | Lee et al. ............................. | 711/207 |
| 5,561,778 | * 10/1996 | Fecteau et al. ...................... | 711/209 |
| 5,566,308 | * 10/1996 | Bendelac et al. ........................ | 711/2 |
| 5,594,881 | * 1/1997 | Fecteau et al. ...................... | 711/209 |

* cited by examiner

Primary Examiner—Tuan V. Thai
(74) Attorney, Agent, or Firm—Blakely, Sokoloff, Taylor & Zafman LLP (57) ABSTRACT

An apparatus and method for accessing a memory. A source address that includes a page address and a page offset is received. The page address requires translation in order to form a first address that can be used to transfer data from a row of memory cells into a sense amplifier array in a memory. The page address is compared to contents of one or more page registers to determine if the data is present in the sense amplifier array as a result of a previous memory access. A second address is asserted to access a portion of the data if the data is determined to be present in the sense amplifier array.

29 Claims, 7 Drawing Sheets

PHYSICAL ADDR [31-0] = $\underbrace{31 - 12}_{\text{PAGE ADDR [19-0]}}$ $\underbrace{11 - 0}_{\text{PAGE OFFSET [11-0]}}$

FIG. 6A

MEMORY CONFIGURATION 1 :
(8 DEVICES / FILE)

2     BANKS
2048  ROWS / BANK
1024  COLUMNS / ROW
8     BITS / COLUMN $\Longrightarrow$ 
COL ADDR [9-0] = PHYS ADDR [12-3] = PAGE ADDR [0] + PAGE OFFSET [11-3]
ROW ADDR [10-0] = PHYS ADDR [23-13] = PAGE ADDR [11-1]
BANK ADDR [0] = PHYS ADDR [24] = PAGE ADDR [12]

MEMORY CONFIGURATION 2 :
(8 DEVICES / FILE)

2     BANKS
1024  ROWS / BANK
2048  COLUMNS / ROW
8     BITS / COLUMN $\Longrightarrow$ 
COL ADDR [10-0] = PHYS ADDR [13-3] = PAGE ADDR [1-0] + PAGE OFFSET [11-3]
ROW ADDR [9-0] = PHYS ADDR [23-14] = PAGE ADDR [11-2]
BANK ADDR [0] = PHYS ADDR [24] = PAGE ADDR [12]

ACHIEVING PAGE HIT MEMORY CYCLES ON A VIRTUAL ADDRESS REFERENCE

FIELD OF THE INVENTION

The present invention relates to virtual addressing, and more particularly to reducing the amount of time required to access memory in response to a virtual address reference.

BACKGROUND OF THE INVENTION

Many modern computer systems use virtual addressing to hide the underlying complexity of their physical address spaces. A virtual address is an address that must be translated into a physical address before it can be used to access memory. By presenting a computer system's operating memory as a virtual address space, the operating memory may be made to appear larger or less fragmented than it actually is. For example, in a computer system that has a 32 MB (mega-byte) operating memory, an even larger virtual memory may be presented for use by application programs by mapping portions of the virtual memory to a storage other than the operating memory (e.g., a disk drive). If necessary, regions of the virtual address space can be dynamically remapped from a relatively slow mass storage device to operating memory. Also, a physical operating memory that has gaps of unused physical address space (i.e., a fragmented memory) can be made to appear as a contiguous address space in the virtual realm.

One important application of virtual addressing is the storage and retrieval of graphics objects, such as textures, depth information and color information, in operating memory. Because graphics objects are often used to provide real-time visual effects, it is important that graphics objects be retrieved from memory quickly and without spending excessive time translating their virtual address references.

In many computer systems, virtual addresses are translated into physical addresses by a processor (or other bus master) before the processor issues memory access requests to a memory controller. In other computer systems, at least some virtual-to-physical address translation is performed in the memory controller. Performing address translation in the memory controller centralizes the address translation activity and allows virtual addressing to be used by subsystems in the computer system that do not have address translation capability.

One technique for performing a virtual-to-physical address translation in a memory controller is for the memory controller to use incoming virtual addresses to index a lookup table in operating memory. The lookup table is initialized with physical addresses during system startup so that, when indexed using a virtual address, the corresponding physical address is returned to the memory controller. Unfortunately, this technique requires the memory controller to access memory twice in response to a single memory access request; one memory access to retrieve a physical address and a second memory access to operate on the memory location indicated by the physical address. The extra memory access required to retrieve the physical address from the lookup table significantly slows the overall response to the original memory access request.

One technique for avoiding the need to access a lookup table in response to a virtual address is to buffer recently used physical addresses in the memory controller. When a virtual address is received, it is compared against previously received virtual addresses to determine if a corresponding physical address has been buffered. If a corresponding physical address has been buffered, then the access to the address lookup table is unnecessary and the buffered physical address can be used to access the memory location of interest.

Although buffering physical addresses in the memory controller improves memory access time in response to virtual addresses, substantial time is still usually required (e.g., one or two clock cycles) to determine whether a needed physical address has been buffered in the memory controller. The amount of time required increases with the size of the buffer. Because virtual addressing is often used to perform time critical memory accesses such as retrieval of graphics object information, any reduction in the time required to resolve a virtual address to a physical location in the memory subsystem can significantly increase the overall performance of the computer system.

SUMMARY OF THE INVENTION

An apparatus and method for accessing a memory are disclosed. A source address is received that includes a page address and a page offset. The page address requires translation in order to form a first address that can be used to transfer data from a row of memory cells into a sense amplifier array in a memory. The page address is compared to contents of one or more page registers to determine if the data is present in the sense amplifier array as a result of a previous memory access. If the data is determined to be present in the sense amplifier array, a second address is asserted to access a portion of the data.

Other features and advantages of the invention will be apparent from the accompanying drawings and from the detailed description that follows below.

BRIEF DESCRIPTION OF THE DRAWINGS

The present invention is illustrated by way of example and not limitation in the figures of the accompanying drawings in which like references indicate similar elements and in which.

DETAILED DESCRIPTION

It is an intended advantage of embodiments disclosed herein to reduce the amount of time required to resolve a virtual address to a physical location in a memory subsystem by associating virtual addresses with active rows within the memory subsystem. When a virtual address is received in a subsystem controller, the subsystem controller compares the virtual address to one or more previously received virtual addresses that are associated with respective active rows within the memory subsystem. If the virtual address matches one of the previously received virtual addresses, then the active row associated with the previously received virtual address is the row sought to be accessed by the current virtual address and access may be made to the active row without having to wait for a physical address to be supplied by address translation logic.

It is another intended advantage of embodiments disclosed herein to provide a column address cache for storing physical address bits that can be used to form a complete column address. As described below, the row size of memory components in a memory subsystem may be larger than can be resolved by the page offset portion of a virtual address. In other words, the column address may require more bits than are provided by the page offset component of the virtual address. Consequently, even if it is determined that a row of data sought to be accessed by a virtual address reference is already active, the page offset portion of the virtual address reference may be insufficient to uniquely identify the column to be accessed within the active row. In embodiments described below, this problem is solved by using the column address cache to record bits from a physical page address that has been retrieved from address translation logic in response to a previous virtual address. The bits in the column address cache are used in combination with the page offset from a subsequent virtual address to provide a complete column address. The column address may then be used to perform a read or write access to an active row without having to wait for a physical address to be output by the address translation logic. These and other intended advantages are described below.

Figure 1:
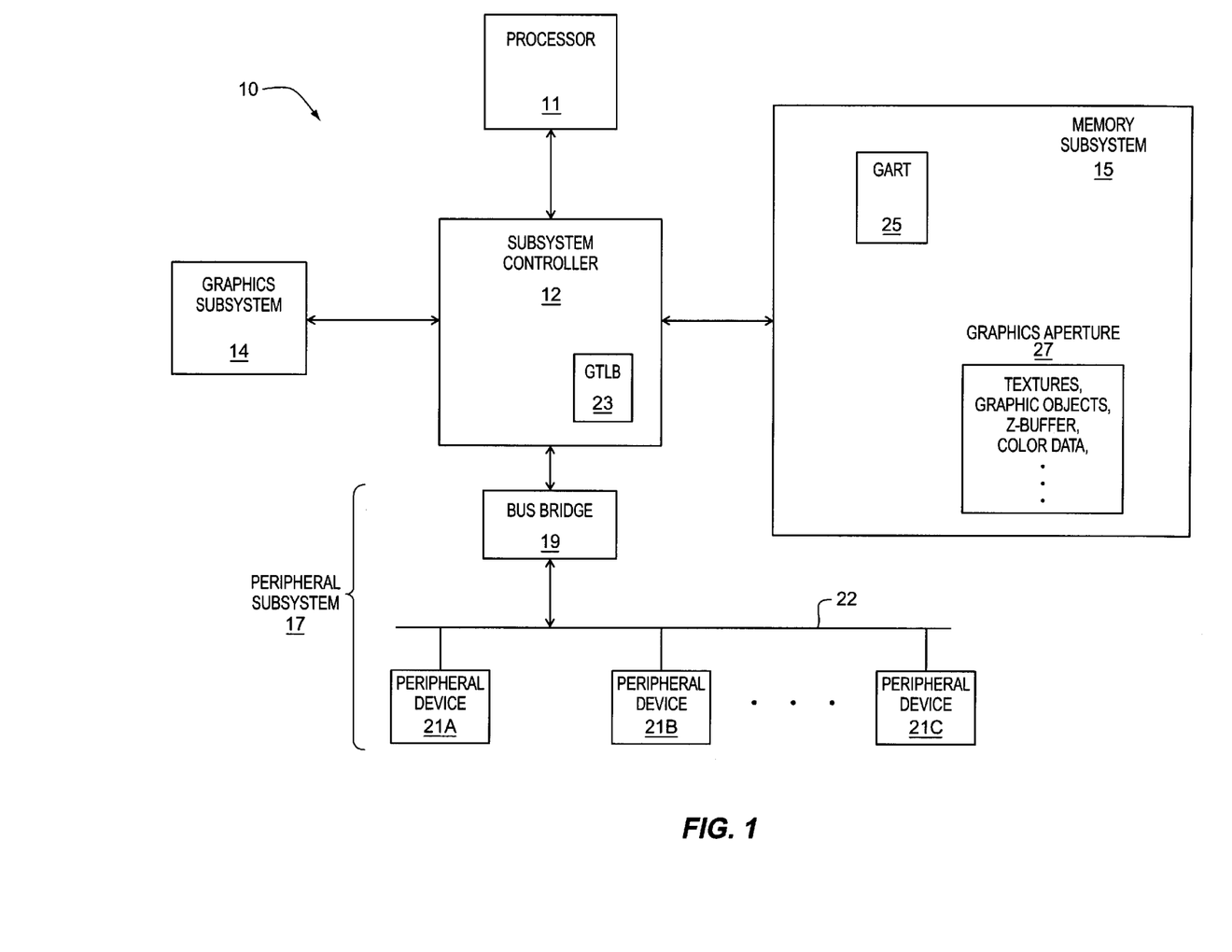
FIG. 1 is a block diagram of a computer system.

FIG. 1 is a block diagram of an embodiment of a computer system 10 in which virtual addressing may be used to read and write graphics objects. The computer system contains at least one processor 11, a graphics subsystem 14, a memory subsystem 15 and a peripheral subsystem 17, all interconnected by a subsystem controller 12. As indicated, the peripheral subsystem 17 includes a bus 22 (e.g., a Peripheral Component Interconnect (PCI) bus, an Industry Standard Architecture (ISA) bus, an Extended Industry Standard Architecture (EISA) bus a Microchannel bus, or any other bus for transferring data and commands), peripheral devices coupled to the bus 21A, 21B, 21C and a bus bridge 19 that interconnects the bus 22 and the subsystem controller 12. The peripheral devices 21A, 21B, 21C coupled to the bus 22 may include bus master devices that are capable of initiating communications to other peripheral devices on the bus 22 and to other subsystems coupled to the subsystem controller 12, including the processor 11.

In an alternate configuration of the computer system 10, the graphics subsystem 14 may be a peripheral device on the bus 22 or the graphics subsystem 14 may be coupled directly to the memory subsystem 15. Also, the interface between the graphics subsystem 14 and the subsystem controller 12 may be an Accelerated Graphics Port (AGP) that complies with the "Accelerated Graphics Port Interface Specification" Revision 1.0 (or later revisions), published Aug. 1, 1996 by Intel Corporation of Santa Clara, Calif.

Although an important function of the subsystem controller 12 is to provide an interface between the processor 11, the graphics subsystem 14 and the peripheral subsystem 17, the subsystem controller 12 also acts as a memory controller that manages requests from the processor 11, graphics subsystem 14 and peripheral subsystem 17 to access the memory subsystem 15.

The subsystem controller 12 includes a construct called a graphics translation lookaside buffer (GTLB) 23 that is used to cache physical addresses that correspond to incoming virtual addresses. Note that the expression "virtual address" is used broadly herein to mean any address that must be translated before it can be used to access memory. For example, addresses that are mapped outside the address range (or ranges) encompassed by the memory subsystem 15 are considered to be virtual addresses.

When a virtual address is received in the subsystem controller 12, the subsystem controller 12 determines if a physical address that corresponds to the virtual address is present in the GTLB 23. If so, then a GTLB hit is signaled and the physical address is retrieved from the GTLB 23 and concatenated with the least significant portion of the virtual address to generate an address that can be applied to access the memory subsystem 15. If an incoming virtual address does not produce a GTLB hit (i.e., a GTLB miss occurs), the virtual address is used to look up the corresponding physical address in a table in the memory subsystem 15 called the graphics aperture resource table (GART) 25. The GART 25 is a table of physical addresses that is constructed during system startup time when the extent of the physical memory is determined.

Figure 2A:
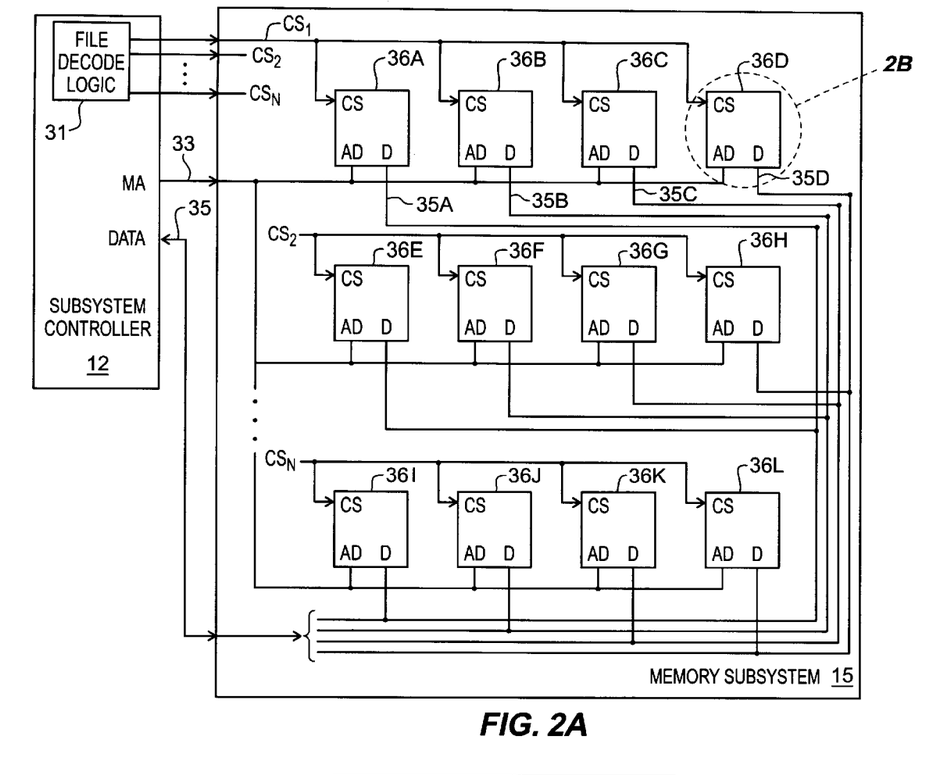
FIG. 2 is a block diagram of a memory subsystem that can be used with the computer system of FIG. 1.
Figure 2B:
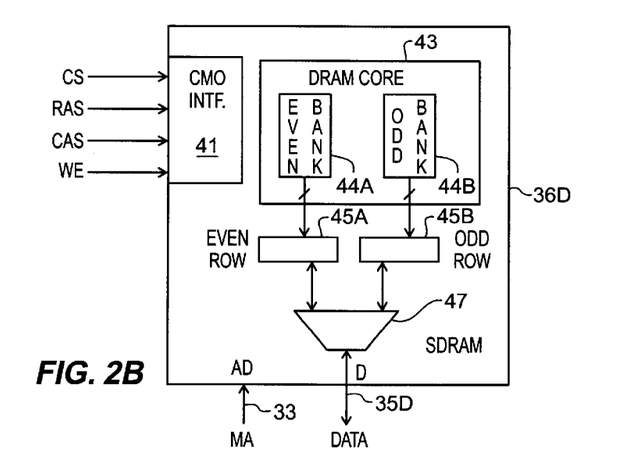

FIG. 2 is a diagram of an embodiment of memory subsystem 15 showing its principal connections to the subsystem controller 12. The memory subsystem 15 is made up of a plurality of discrete memory components 36A–36L. These components are typically dynamic random access memory (DRAM) components such as fast page mode DRAM (FPM DRAM), extended data out DRAM (EDO DRAM) or synchronous DRAM (SDRAM) components. However, other configurations of the memory subsystem 15 may be populated with other types memory components, including other types of DRAM components such as Rambus DRAM (RDRAM) and SyncLink DRAM (SLDRAM) components.

For the purpose of the following discussion, the memory components 36A–36L are assumed to be SDRAM components because SDRAM components have attributes that are characteristic of a broad range of memory devices. For example, SDRAM components have multiplexed address interfaces like FPM DRAM and EDO DRAM components, and SDRAM components have multiple storage banks like RDRAM and SLDRAM components.

The SDRAM components 36A–36L are arranged in groups called component files (also known as device rows). A component file is a group of memory components that are coupled to the same chip select line. SDRAM components 36A, 36B, 36C and 36D form a component file that is selected by chip select line $CS_1$, SDRAM components 36E, 36F, 36G and 36H form a component file that is selected by chip select line $CS_2$, and so forth to SDRAM components 36I, 36J, 36K and 36L that form a component file that is selected by chip select line $CS_N$. Chip select logic 31 within the subsystem controller 12 activates one chip select line (and therefore selects one component file) per memory access based on the high-order bits of a physical address. Consequently, when a component file is selected, the SDRAM components within the component file are accessed concurrently. Each of the SDRAM components of a given component file sends and receives data via a respective portion of the data path 35 and all of the SDRAM components in the memory subsystem 15 are typically coupled to the multiplexed address bus 33.

An expanded view of one of the SDRAM components 36D illustrates the primary inputs and functional elements of the SDRAM component 36D. The SDRAM 36D includes a DRAM core 43 that is made up of two or more storage banks 44A, 44B. Each of the storage banks 44A, 44B of the DRAM core 43 is coupled by via a plurality of bit lines to a respective sense amplifier bank 45A, 45B that forms a row cache. The expression "row cache" is used herein to refer collectively to the respective sense amplifier banks within individual memory components that are accessed in response to the same chip select, command and address signals.

When a row address is asserted on the MA lines 33, a row of DRAM memory cells within a selected one of the storage banks 44A, 44B is transferred to a corresponding one of the sense amplifier banks 45A, 45B. This is referred to as activating a row. Once a row has been activated, data from the active row may be read or written repeatedly at locations within the row indicated by respective column addresses. The row of memory cells is typically on the order of at least 512 data units wide so that it is common for successive column addresses to "hit" an active row. This is referred to as a "page hit". A memory access that results in a page hit can be serviced in a relatively short time because the time required to activate a row is avoided.

A command interface 41 within the SDRAM component 36D receives signals from the subsystem controller 12 that include the above mentioned chip select signal as well as a row address strobe (RAS), column address strobe (CAS) and write enable (WE) signal. The command interface 41 is enabled only when the chip select signal is asserted so that the SDRAM component 36 be accessed only when its chip select signal is active. The RAS, CAS and WE are used to command various operations within the SDRAM component 36 including row activations, read/write operations and precharge operations. The address generator may alternately be configured to output address signals onto another type of path for communicating address information to memory devices in the memory subsystem, including, but not limited to, a Rambus Channel or SyncLink bus pair. Herein, Rambus Channel refers to a memory interconnect path that complies with one or more specifications published by Rambus, Inc. of Mountain View, Calif. or its assigns or successors (collectively "Rambus, Inc."). Rambus DRAM refers to a memory device for coupling to a Rambus Channel and that complies with a specification published by Rambus, Inc. A SyncLink bus pair refers to a memory interconnect path that complies with one or more specifications published by the SyncLink Consortium or its assigns or successors (collectively "SyncLink Consortium"). The SyncLink Consortium was formed in 1995 by the SyncLink Trade Association. SyncLink DRAM refers to a memory device for coupling to a SyncLink bus pair. A SyncLink bus pair includes a SendLink bus for carrying command, address and write data to attached SLDRAM devices and a SinkLink bus for carrying data from the SLDRAMs back to a memory controller.

Figure 3:
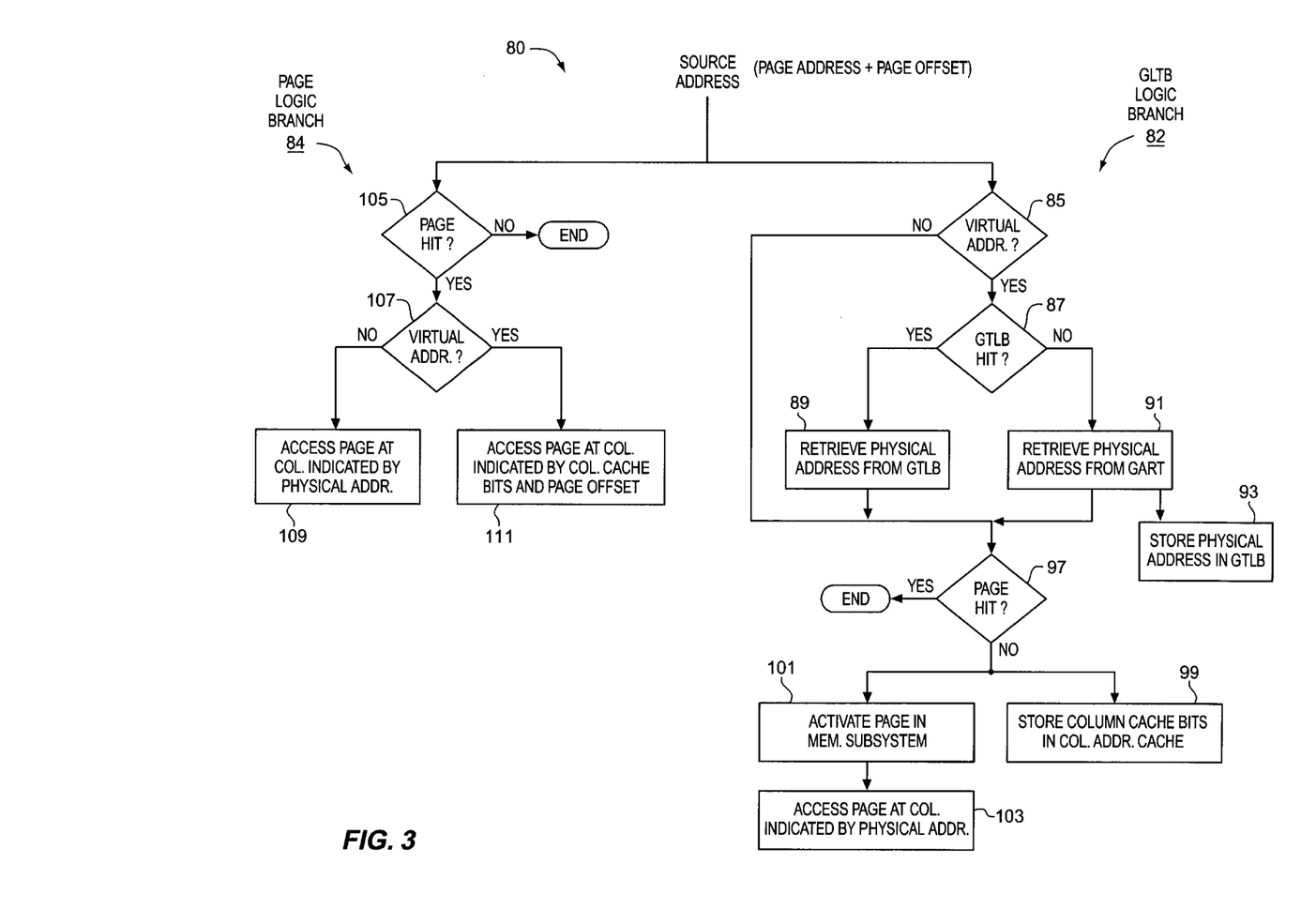
FIG. 3 is a flow diagram that illustrates operation of a subsystem controller according to one embodiment.

FIG. 3 is a flow diagram that illustrates operation of a subsystem controller according to one embodiment. Initially an address is received from another subsystem in a request to access memory. The address is referred to as a source address because it is used to produce other address values as will be discussed. As indicated, the source address includes two components: a page address which may be physical or virtual, and a page offset. When a source address is received in the subsystem controller, two activities are begun in parallel as indicated by flow branches 82 and 84.

In GTLB logic branch 82, the source address is inspected to determine whether it is a virtual address or physical address (decision block 85). If the source address is a virtual address, then a graphics translation lookaside buffer (GTLB) is inspected at block 87 to determine whether the incoming address hits the GTLB. If so, a physical page address is retrieved from the GTLB and concatenated with the page offset component of the source address to produce a physical address. If the source address does not hit the GTLB, then a physical page address is retrieved from the GART at block 91 and concatenated with the page offset component of the source address to produce a physical address. The physical page address retrieved from the GART is stored in the GTLB in block 93. Returning to decision block 85, if the source address is not a virtual address, then a page address does not have to be retrieved from the GTLB or GART and blocks 87, 89, 91 and 93 are bypassed.

Page logic branch 84 is executed concurrently with the GTLB logic branch 82. At block 105, a portion of the source address is compared against the contents of one or more page address registers to determine if there is a page hit. As discussed below, the contents of each of the page address registers is a portion of a previously asserted address that corresponds to an active row within the memory subsystem. Thus, if the source address matches a page address register, the source address indicates a request to access an already active row within the memory subsystem and a page hit is indicated at decision block 105. If a page hit is detected at decision block 105, the source address is evaluated at decision block 107 to determine whether it is a virtual address. If the source address is a physical address, then the active row is accessed at a column indicated by the physical address (block 109). If the source address is a virtual address, then the active row is accessed using a column address formed by concatenating bits from the page offset component of the source address and bits from a column address cache ("column cache bits"). The purpose of the column address cache and the column cache bits is discussed below.

Reflecting on logic diagram 80, it can be seen that memory access in response to a virtual address may be performed more quickly than in the prior art techniques described above, because it is unnecessary to wait for virtual-to-physical address translation in every case. Instead of waiting for a virtual address to be translated into a physical address, a page hit determination is made on the virtual address itself. If there is a page hit on the virtual address (i.e., a virtual page hit), the page offset portion of the source address may be used to access memory without having to wait for a physical page address to be retrieved from the GTLB (or GART). One complication of this technique, as discussed below, is that the active row of memory may be larger than can be resolved by a page offset alone. That is, one or more bits of a physical page address may be required to produce a column address. In embodiments described below, these bits are obtained from a column address cache. In essence, column address bits from a previous translation of a virtual address are stored in the column address cache for use in subsequent accesses that have the same virtual address reference. As a result, an active page can be accessed without having to wait for translation of a virtual address reference, saving considerable time and increasing data throughput in the computer system.

If a page hit is not detected at decision block 105, the page logic branch 84 ends. Conversely, execution of the GTLB logic branch 82 goes forward at decision block 97 if a page hit is not detected. Because a physical address has been obtained by the time decision block 97 is reached (either by access to the GTLB/GART or because the source address was a physical address), a row address may be asserted to activate a row in the memory at block 101. That is, bits in the physical address may be decoded to assert one of a plurality of chip select lines to select a component file, and bits in the physical address may be applied to an address path (e.g., the multiplexed address path, a Rambus Channel, a SyncLink bus pair or other memory interconnect path) to address a bank and row within the target device. After a row of the memory subsystem has been activated in block 101, a column address indicated by the physical address may be asserted at block 103 to write or read a portion of the active row.

In most DRAM technologies, a delay is required between assertion of a row address and a column address. This delay is typically expressed as a time between assertion of row address strobe (RAS) and column address strobe (CAS) signals and is known as a RAS-to-CAS interval. In one embodiment, one or more column cache bits are stored in the column address cache column address cache during the RAS-to-CAS interval (block 99). Because this storage operation takes place during the RAS-to-CAS interval, no additional delay is incurred.

Figure 4:
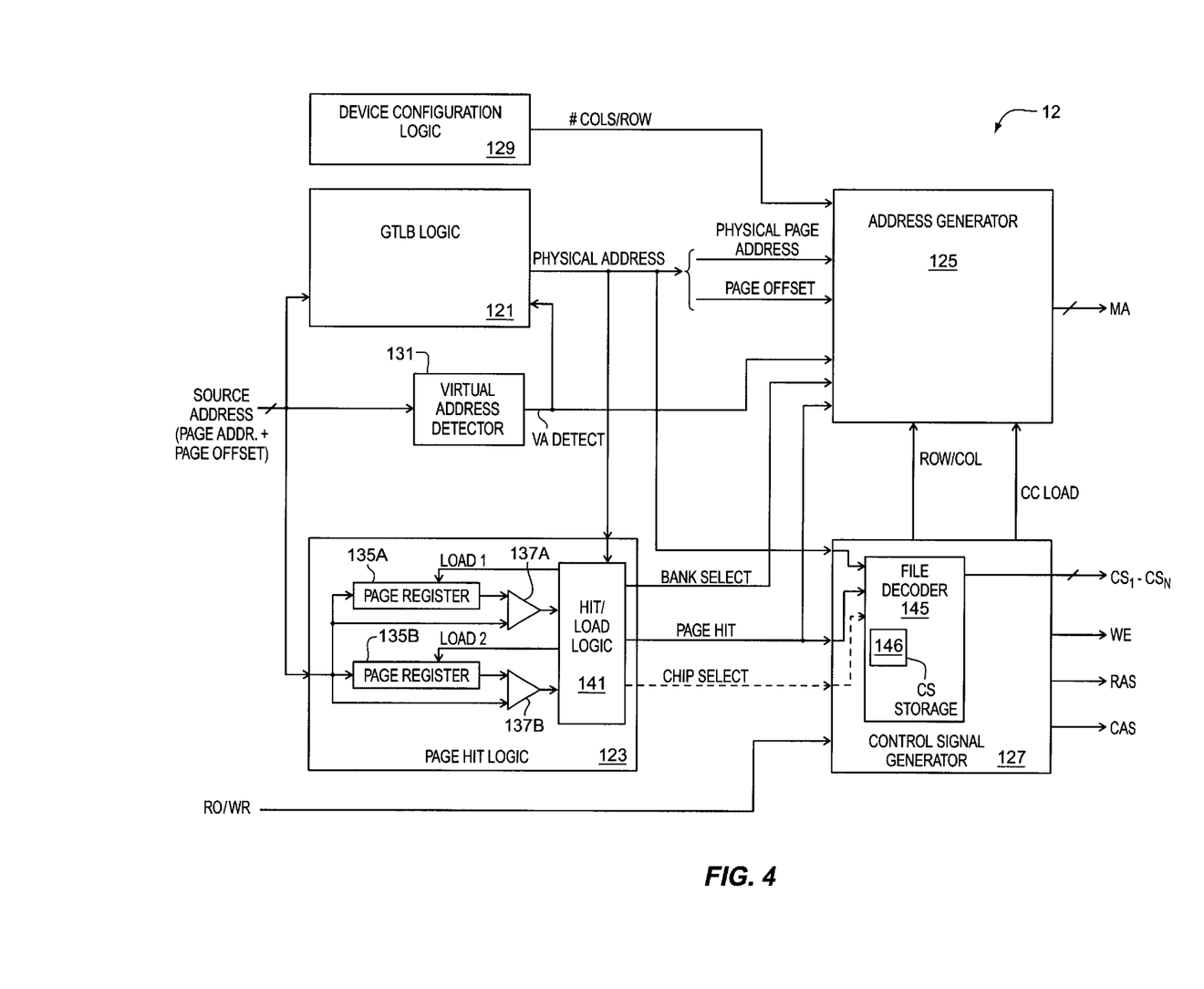
FIG. 4 is a block diagram of a subsystem controller according to one embodiment.

FIG. 4 is a block diagram of a subsystem controller 12 according to one embodiment. The subsystem controller 12 may be used in any device which requires access to a memory subsystem including, but not limited to, a computer system having an architecture generally as shown in FIG. 1.

When a source address is received in the subsystem controller 12, the source address is applied in parallel to a virtual address detector 131, GTLB logic 121 and page hit logic 123. The virtual address detector 131 determines whether the source address is a virtual address and, if so, asserts a signal called virtual address detect signal (VA DETECT). A virtual address may be detected in a number of ways including, but not limited to, determining that the source address indicates a storage location above the top of physical memory or determining that the source address falls within a predetermined range of values.

In one embodiment, the GTLB logic 121 processes the source address based on whether the source address is a virtual or physical address (i.e., based on whether or not the virtual address detector 131 asserts the VA DETECT signal). If the source address is a physical address, the GTLB logic 121 passes the physical address unchanged to an address generator 125. If the source address is a virtual address, the GTLB logic 121 translates the virtual page address component of the virtual address into a physical page address. As discussed above, this operation may require the GTLB logic 121 to initiate a memory access to read the physical page address from the GART in the memory subsystem. Together, the physical page address generated by the GTLB logic 121 and the page offset component of the source address constitute a physical address that can be used to select a component file, activate a row and access a column in the active row. The GTLB logic outputs this physical address to the address generator 125.

The page hit logic 123 operates in parallel with the GTLB logic 121. The page hit logic 123 receives the source address as an input, determines whether the source address corresponds to an already active row in the memory subsystem and outputs a page hit signal (PAGE HIT) and a bank select signal (BANK SELECT) accordingly. The page hit logic 123 includes page registers 135A, 135B to hold values called row qualifiers, comparators 137A, 137B to compare the source address against the row qualifiers in the page registers and hit/load logic 141 to generate the page hit signal and the bank select signal based on the output of the comparators 137A, 137B. The hit/load logic 141 also asserts respective load signals to the page registers 135A, 135B to cause new row qualifiers to be loaded into the page registers 135A, 135B.

Herein, the expression "row qualifier" refers to the bits of a source address that either (1) constitute a row address or (2) can be translated to produce a row address. Generally, a row qualifier will include at least a portion of the page address component of the source address and, if warranted by the number and significance of the bits in the row address to be formed, one or more bits of the page offset component of the source address.

Row qualifiers are stored in the page registers 135A, 135B in response to memory cycles that do not produce a page hit. When a source address does not yield a page hit (i.e., there is no match between the source address and row qualifiers in the page registers 135A, 135B), the source address is used to generate a row address to activate a row within the memory subsystem. In one embodiment, during the row activation interval (i.e., the RAS-to-CAS interval), the row qualifier portion of the source address is stored in whichever of the page registers 135A, 135B corresponds to the activated row. Note that the row qualifier may include a virtual component depending on whether the source address is a virtual or physical address. If a subsequent source address includes a row qualifier that matches the row qualifier in the page register 135A, 135B, then a page hit signal will be asserted by the hit/load logic 141 to indicate that the memory access request corresponds to an already active row.

In one embodiment, the hit/load logic 141 generates the page hit signal by logically ORing the outputs of comparators 137A, 137B. If any one of the comparators 137A, 137B indicates a match, a page hit is signaled. If none of the comparators 137A, 137B indicate a match, the hit/load logic 141 deasserts the page hit signal. The hit/load logic 141 generates the bank select signal based on which of the comparators, if any, indicates a hit. In one embodiment, the page hit logic 123 contains at least as many page registers as there are storage banks in a given memory component of the memory subsystem, with each of the page registers being associated with a respective one of the storage banks. If a page hit is signaled, the bank select signal indicates which of the page registers caused the page hit. For example, in an embodiment of the page hit logic that contains two page registers (e.g., page registers 135A, 135B), a single bank select signal line may be used to indicate which of the two page registers caused a page hit. If more than two page registers are present, the bank select signal may be a multiple bit signal.

In one embodiment, the hit/load logic 141 generates a load signal whenever a source address is received that does not produce a page hit. The physical address from the GTLB logic 121 is supplied to the hit/load logic 141 to determine which of the page registers should be loaded. In one embodiment, only the portion of the physical address which specifies a bank within a selected component file is provided to the hit/load logic 141. In an alternate embodiment, the portion of the physical address which specifies the selected component file may also be supplied to the page hit logic 141.

The number of page registers in the page hit logic 123 may vary between implementations based on the type of memory subsystem to be supported and such considerations as whether the logic required to support each additional page register is justified by the incremental increase in the page hit rate. In an embodiment of the page hit logic 123 referred to as a file-tracking embodiment, the number of page registers is at least equal to the number of row caches per component file within the memory subsystem. In an alternate embodiment, referred to as a direct-mapped embodiment, the number of page registers is at least equal to the total number of row caches in the memory subsystem.

In the file-tracking embodiment, each of the page registers 135A, 135B are associated with a respective row cache in the most recently accessed component file. In one implementation of the subsystem controller 12, the most recently accessed component file is recorded (i.e., tracked) by a control signal generator 127. In an alternate implementation, a storage element may be provided in the page hit logic 123 to indicate the most recently accessed component file. Either way, if a page hit occurs, the component file to which the page hit corresponds is known and can be quickly selected by the control signal generator. The bank select signal from the page hit logic 123 indicates which bank is to be accessed within the selected component file. Consequently, when a page hit occurs on either a virtual or physical source address, the active row to which the page hit corresponds may be quickly identified.

In the direct-mapped embodiment of the page hit logic 123, each of the page registers is associated with (i.e., mapped to) a respective row cache in the memory subsystem (e.g., the total number of page registers is the product of the number of row caches per component file and the number of component file). Consequently, when a page hit occurs, the component file and active row within the component file is known by virtue of which page register caused the hit. A chip select signal may be sent from the page hit logic to the control signal generator to cause the control signal generator to assert the appropriate chip select signal. This is indicated by the dashed chip select line in FIG. 4.

In the embodiment depicted in FIG. 4, the control signal generator 127 is used to generate chip select signals and to assert memory access commands via CAS, RAS and WE (write enable) signal lines. In an alternate embodiment, the control signal generator may issue memory access commands via a different memory interconnect path, such as a Rambus Channel or a SyncLink bus pair. Referring to FIG. 4, the control signal generator 127 supplies a row/column signal (ROW/COL) and a column cache load (CC LOAD) to the address generator 125. As discussed below, the row/column signal indicates whether a row or column address is to be driven onto the multiplexed address path (MA) and the column cache load signal is used to load column address bits in the column address cache.

The control signal generator 127 receives a portion of the physical address from the GTLB logic 121 and the page hit signal from the page hit logic 123. The control signal generator 127 also receives a read/write signal (RD/WR) that indicates whether a read access or a write access to the memory subsystem has been requested. The control signal generator 127 includes a file decoder 145 which is used to decode the portion of the physical address received from the GTLB logic 121 into one of a plurality of chip select signals ($CS_1$-$CS_N$). Each chip select signal is supplied to a respective component file within the memory subsystem and only one chip select signal is asserted per memory access cycle. In one embodiment, the file decoder 145 includes a chip-select storage element 146 to record the most recently asserted chip select signal. If the page hit signal indicates a page hit, the file decoder 145 ignores the physical address input from the GTLB logic 121 and asserts the chip select signal indicated by the chip-select storage element 146. As a result, the most recently accessed component file is automatically selected in response to a page hit.

In an embodiment of the control signal generator 127 that may be used with the direct-mapped embodiment of the page hit logic 123, a chip select signal (CHIP SELECT) is supplied from the page hit logic 123 to the control generator 127 to indicate which component file is to be accessed if a page hit occurs. Thus, if a page hit is signaled by the page hit logic 123, the file decoder 145 asserts a chip select signal indicated by the page hit logic 123 and ignores the address bits from the GTLB logic 121.

Still referring to FIG. 4, device configuration logic 129 is used to supply memory configuration signals to the address generator 125. In one embodiment, the device configuration logic 129 includes one or more storage elements that are initialized at system startup based on characteristics of the memory subsystem. Examples of configuration signals that may be output by the device configuration logic include a signal to indicate the number of columns per row of a memory device (#COLS/ROW), a signal to indicate the granularity of the data access (e.g., 16 bit, 32 bit, 64, bit and so forth), and any other configuration signals that may be used to cause the address generator 125 to output configuration-specific address signals.

Figure 5:
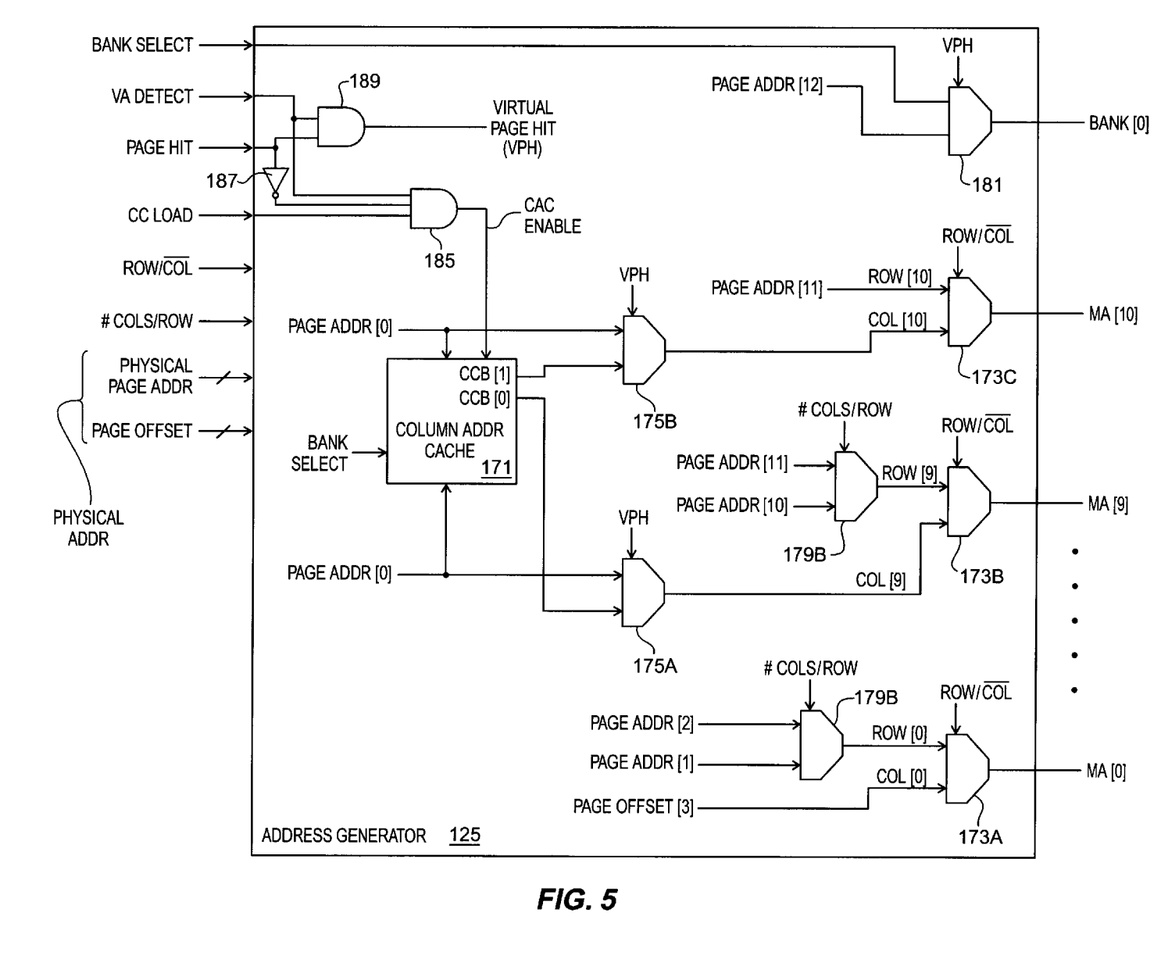
FIG. 5 is a block diagram of an address generator according to one embodiment.

FIG. 5 is a block diagram of the address generator 125 according to one embodiment. The inputs to the address generator 125 include the bank select signal and page hit signal from the page hit logic 123, the virtual address detect signal from the virtual address detector 131, the row/column signal and the column cache load signal (CC LOAD) from the control signal generator 127, the number of columns per row (#COLS/ROW) from the device configuration logic 129 and the physical address from the GTLB logic 121. In response to these inputs, the address generator 125 outputs row and column addresses to a multiplexed address bus (MA). For the purpose of the following description, the multiplexed address bus is assumed to include twelve signal lines, MA[10-0] and Bank[0]. Different interface configurations, including an interface for coupling to a SyncLink bus pair or to a Rambus Channel may be used in alternate embodiments.

Row/column address multiplexers 173A, 173B, 173C are provided to steer either column address signals COL[10-0] or row address signals ROW[10-0] onto the multiplexed address bus lines MA[10-0] depending on the state of the row/column signal (i.e., ROW/COL). Other multiplexers 175A, 175B, 179A, 179B are used to determine which bits of a physical address are to be used to generate the row and column address signals.

As mentioned above, device configuration signals are asserted by the device configuration logic (element 129 of FIG. 4) based on characteristics of the memory subsystem. These characteristics impact which bits of a physical address are used to produce row and column addresses and may include such parameters as the number of storage banks per memory component, the number of rows of memory cells per storage bank, the number of addressable columns per row, the number of bits per column and the number of memory components per component file.

Figure 6A:
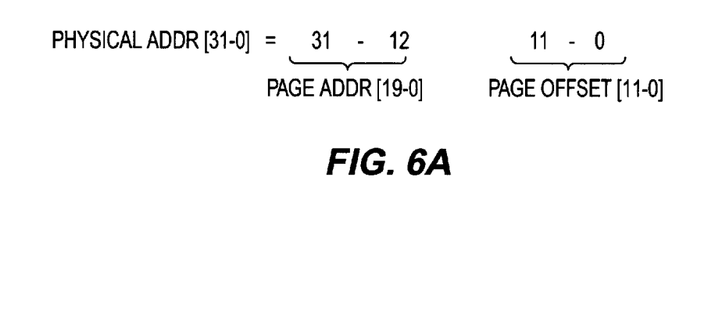
FIG. 6A illustrates partitioning of a thirty-two bit physical address into exemplary page address and page offset components.

FIG. 6A illustrates partitioning of a thirty-two bit physical address into exemplary page address and page offset components. Bits 31-12 of the physical address correspond to bits 19-0 of the page address, and bits 11-0 of the physical address correspond to bits 11-0 of the page offset.

Figure 6B:
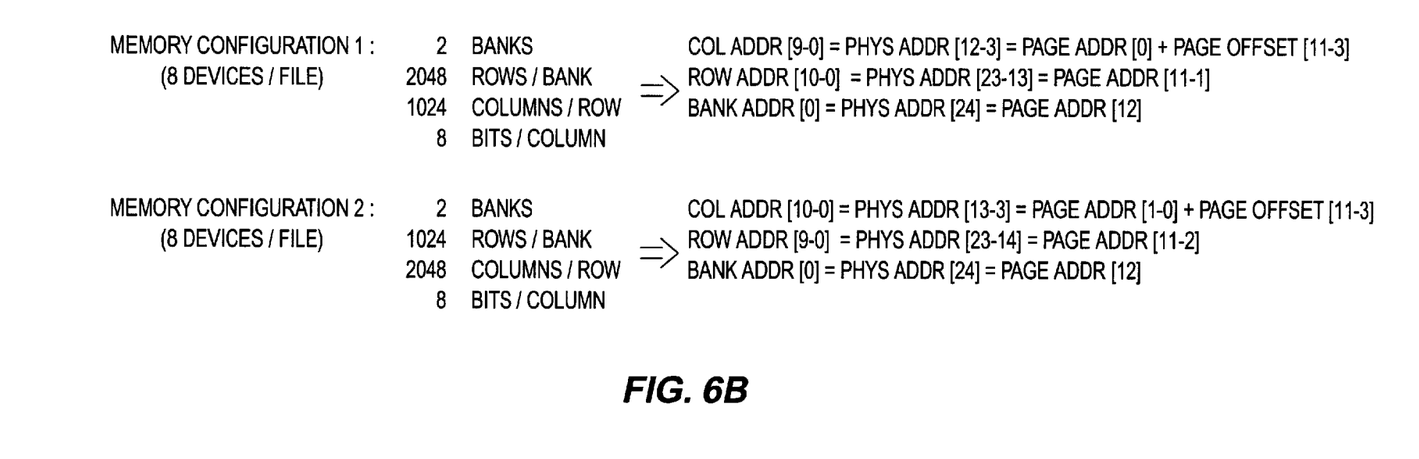
FIG. 6B illustrates the correspondence between the bits of a physical address and the bits of row, column and bank addresses for two exemplary configurations of a memory subsystem.

FIG. 6B illustrates the correspondence between the bits of the physical address in FIG. 6A and the bits of row, column and bank addresses for two exemplary configurations of a memory subsystem.

In the first exemplary memory configuration, the memory subsystem is populated with memory components that each include two storage banks, 2048 rows of storage cells per storage bank, 1024 addressable columns per row and 8 bits per column. There are eight such memory components per component file so that each memory access operates on an eight byte value. Consequently, the least three significant bits of the page offset may be dropped when accessing the memory subsystem. Because there are 1024 addressable columns per row, ten bits are required in the column address. Similarly, because there are 2048 rows per storage bank, eleven bits are required in the row address. A single address bit may be used to select between the two banks. FIG. 6B illustrates the bit mapping between the physical address of FIG. 6A and the column, row and bank addresses required by the first memory configuration. A significant aspect of this bit mapping is that the ninth bit of the column address (COL ADDR[9]) is mapped to the zeroth bit of the page address component of the physical address. This means that at least bit zero of a physical page address is required to provide a complete column address. Consequently, if a page hit occurs on a source address that includes a virtual page address, translation of at least one bit of the virtual page address is required in order to access the active row. This presents a problem because a significant benefit of achieving a page hit on a virtual address reference is lost if a memory access must nonetheless await translation of the virtual page address into a physical address.

In the second memory configuration depicted in FIG. 6B, each memory component has two banks, 1024 rows per bank, 2048 columns per row and eight bits per column. This results in a mapping of the zeroth and first physical page address bits to the ninth and tenth bits of the column address. Consequently, two bits of a virtual page address must be translated to form a column address that can be asserted in response to a virtual page hit.

FIG. 5 illustrates one embodiment for overcoming the problem of supplying a complete column address when a virtual page hit occurs. Instead of waiting to obtain the missing column address bits from a translation of the virtual source address, a column address cache 171 is used to provide the missing column address bits. As indicated in FIG. 5, the column address cache receives bits one and zero of the physical page address (PAGE ADDR[1] and PAGE ADDR[0]), the bank select signal (BANK SELECT) and the column cache load signal (CC LOAD) as inputs. The column address cache 171 outputs column cache bits one and zero (CCB[1] and CCB[0]) to multiplexers 175B, 175A which are used to supply column address bits ten and nine, respectively, to the multiplexed address bus. When the virtual address detect signal (VA DETECT) and the page hit signal (PAGE HIT) are both true, a virtual page hit signal (VPH) is output by the logic gate 189 and used to steer the column cache bits through their respective multiplexers 175A, 175B. When a virtual page hit does not occur (i.e., the page hit signal is deasserted or a physical source address is detected), the physical page address bits one and zero (PAGE ADDR[1] and PAGE ADDR[0]) are routed through the multiplexers 175A, 175B instead of the column cache bits. A column address cache enable signal (CAC ENABLE) is used to load physical page address bits one and zero into the column address cache 171 when a virtual source address does not produce a page hit. In one embodiment, the column address cache enable signal is generated by the logical ANDing of the CC LOAD signal (generated by the control signal generator to signal the start of a RAS-to-CAS interval), the virtual address detect signal (VA DETECT) and an inversion of the page hit (PAGE HIT) signal. Consequently, the column address cache 171 is loaded with the physical page address bits during the RAS-to-CAS interval of a memory cycle on a virtual source address that does not yield a page hit. More generally, the column address cache may be loaded at any time during which a valid physical page address is present at the input of the column address cache and a virtual source address does not produce a page hit.

Figure 7:
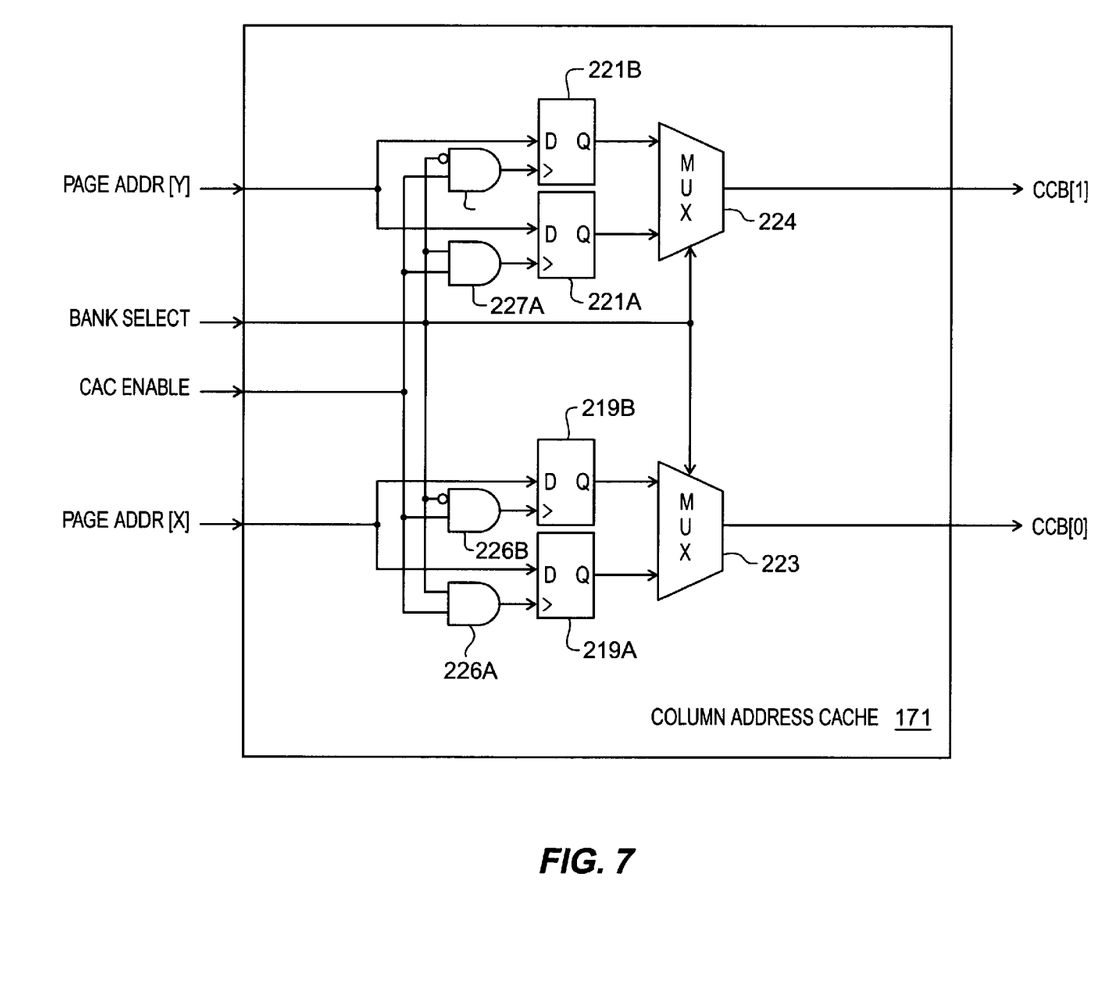
FIG. 7 depicts a column address cache according to one embodiment.

FIG. 7 depicts a column address cache 171 according to one embodiment. The column address cache 171 contains a pair of storage elements 219A, 219B for column cache bit output CCB[0] and a pair of storage elements 221A, 221B for column cache bit output CCB[1]. For a given column cache bit output, separate storage elements are provided for each of two banks in a two-bank memory component. It will be appreciated that additional storage elements may be provided for memory components having additional banks. The input page address bits (PAGE ADDR[X], PAGE ADDR[Y]) are applied to the inputs of the respective pairs of storage elements (219A, 219B and 221A, 221B) and the bank select signal (BANK SELECT) and the column address cache enable signal (CAC ENABLE) are applied to strobe the page address bits into one storage element of each pair of storage elements in a given load operation. The bank select signal is used to determine which of the storage elements of a storage element pair is loaded. The outputs of each storage element pair (219A, 219B and 221A, 221B) are applied to a respective multiplexer 223, 224 which steers one of the two stored bits onto a column cache bit line CCB[0], CCB[1] according to the state of the bank select signal.

Although the column address cache 171 has been described as supplying two column cache bits in response to a virtual page hit signal, it will be appreciated that the column address cache 171 may more or fewer column cache bits in alternate embodiments. Also, the variables X and Y are used in the subscript of the page address bits (e.g., PAGE ADDR[X]) to indicate that the page address bits that are input to the column address cache 171 may vary between implementations of the subsystem controller. The page address bits that are input to the column address cache 171 may also vary based on the configuration of the memory subsystem.

Returning to FIG. 5, the BANK[0] line of the multiplexed address is driven by either the bank select signal or bit twelve of the physical page address (PAGE ADDR[12] depending on whether a virtual page hit has occurred. Additional multiplexers may be provided to select between bank select lines and page address lines if there are more than two banks per memory component.

Multiplexers 179A, 179B are also provided to select the appropriate page address signals to drive the row address lines ROW[9-0]. Referring to the ROW[0] signal, depending on the number of columns per row (#COLS/ROW), different bits of the page address may actually be used to drive the zeroth bit of the row address. In order to support both of the memory configurations shown in FIG. 6B, for example, either PAGE ADDR[2] or PAGE ADDR[1] is selected to drive the zeroth bit of the row address (ROW[0]) depending on the #COLS/ROW signal. Similar logic is used to select between PAGE ADDR[11] and PAGE ADDR[10] to drive the ninth bit of the row address (ROW[9]). In the exemplary embodiment of FIG. 5, only PAGE ADDR[11] is used to drive ROW[10], because only row address bits 0 through 9 are used in memory configuration 2 of FIG. 6B. It will be appreciated that additional bit steering and selection logic may be used to provide compatibility with other memory configurations.

The virtual address detect signal (VA DETECT) and the page hit signal (PAGE HIT) are received from the virtual address detector and the page hit logic, respectively, and are used to determine whether a page hit has occurred on a virtual address reference (i.e., a virtual page hit). In one embodiment, the virtual address detect signal and the page hit signal are logically ANDed to produce a virtual page hit signal (VPH). As discussed below, the virtual page hit signal (VPH) is used to select between address bit sources used to generate a column address. The column cache load signal (CC LOAD) is received from the control signal generator and combined with the virtual address detect signal (VA DETECT) and the inverse of the virtual page hit signal (PAGE HIT) to produce a column address cache enable signal (CAC ENABLE). The CAC enable signal is used to enable column address bits into the column address cache 171 as discussed above in reference to FIG. 7.

Although embodiments have been described herein in conjunction with virtual addresses that are translated in order to access memory, the present invention may also be used with physical addresses that require some form of address translation, such as in, for example, systems that perform a physical-to-physical address translation.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly to be regarded in an illustrative rather than a restrictive sense.

What is claimed is:

1. A method of accessing a memory comprising:
   receiving a source address that includes a page address and a page offset, the page address requiring translation in order to form a first address that can be used to transfer data from a row of memory cells into a sense amplifier array in a memory;
   comparing the page address to contents of one or more page registers to determine if the data is present in the sense amplifier array as a result of a previous memory access; and
   asserting a second address to access a portion of the data if the data is determined to be present in the sense amplifier array.

2. The method of claim 1 wherein asserting a second address to access a portion of the data comprises asserting a column address that includes bits in the page offset and one or more bits that have been stored during the previous memory access.

3. The method of claim 2 wherein each of the one or more bits that have been stored during the previous memory access are stored in respective storage elements in a memory controller.

4. The method of claim 2 wherein asserting a column address that includes bits from the page offset together with the one or more bits that have been stored during the previous memory access comprises concatenating the bits from the page offset with the one or more bits stored during the previous memory access to form the column address.

5. The method of claim 4 wherein concatenating the bits from the page offset with the one or more bits stored during the previous memory access comprises forming a column address in which the bits from the page offset are least significant bits of the column address and in which the one or more bits stored during the previous memory access are most significant bits of the column address.

6. A method of accessing a memory comprising:
   receiving a virtual address that includes a page offset and a virtual page address;
   comparing the virtual page address against contents of one or more page registers to determine if data from a row of memory cells that correspond to the virtual page address is present in a first sense amplifier bank in the memory due to an access to the row of memory cells in a previous memory cycle;
   asserting an address to access a portion of the data if the data is present in the first sense amplifier bank.

7. The method of claim 6 further comprising, concurrently with the act of comparing the virtual page address against contents of one or more page registers, determining if a physical page address that corresponds to the virtual page address is stored in an address translation buffer.

8. The method of claim 7 further comprising storing a bit of the physical page address in a bit storage element if the virtual page address does not match the contents of one of the one or more page registers.

9. The method of claim 8 wherein asserting an address to access a portion of the data comprises forming the address to access the portion of the data by concatenating bits from the page offset with a bit from the bit storage element, the bit from the bit storage elements having been stored in the bit storage element during a previous memory access cycle.

10. The method of claim 7 further comprising storing the virtual page address in one of the one or more page registers if the virtual page address does not match the contents of the one or more page registers.

11. The method of claim 6 wherein the memory comprises a dynamic random access memory (DRAM) component having a plurality of sense amplifier banks, and wherein comparing the virtual page address against contents of one or more page registers comprises comparing the virtual page address against contents of a plurality of page registers, each of the plurality of page registers corresponding to a respective one of the plurality of sense amplifier banks in the DRAM component.

12. The method of claim 11 wherein asserting an address to access a portion of the data if the data is present in the sense amplifier bank comprises asserting an address that includes one or more bank address bits that indicate the first sense amplifier bank from among the plurality of sense amplifier banks.

13. The method of claim 12 wherein the one or more bank address bits have respective states that are determined according to which of the plurality of page registers matches the virtual page address.

14. The method of claim 11 wherein the DRAM component is a synchronous DRAM component.

15. The method of claim 11 wherein the DRAM component is a Rambus DRAM component.

16. The method of claim 6 wherein the memory comprises a plurality of dynamic random access components arranged in component rows, one of the component rows being selected for access during a given memory cycle, and wherein asserting an address to access a portion of the data includes asserting a chip select signal to select a first component row of the component rows, the first component row including the first sense amplifier bank.

17. An apparatus for accessing a memory in response to receiving a source address that includes a virtual page address and a page offset, the apparatus comprising:

page hit logic to compare the virtual page address against a previously received virtual page address to determine if data from a row of memory cells that correspond to the previously received virtual page address is present in a sense amplifier bank of the memory; and address generation logic to assert an address to access a portion of the data if the data is indicated by the virtual page logic to be present in a sense amplifier bank of the memory.

18. The apparatus of claim 17 further comprising a translation buffer and translation logic to determine if a physical page address that corresponds to the row of memory cells is stored in the address translation buffer.

19. The apparatus of claim 18 further comprising one or more bit storage elements to capture respective bits from the physical page address if the page hit logic determines that data from a row of memory cells that correspond to the previously received page address are not present in a sense amplifier bank of the memory.

20. The apparatus of claim 19 wherein the address generation logic asserts an address that includes bits from the page offset and one or more bits from the one or more bit storage elements if the data is indicated by the page hit logic to be present in a sense amplifier bank of the memory.

21. The apparatus of claim 17 wherein the translation logic includes logic to retrieve the physical page address from a table in the memory and to store the physical page address in the translation buffer if the physical page address is determined not to be stored in the address translation buffer.

22. The apparatus of claim 17 wherein the page hit logic includes one or more page registers in which respective previously received virtual page addresses are stored.

23. The apparatus of claim 22 wherein the page hit logic includes logic to store the virtual page address in one of the one or more page registers if the virtual page address does not match one of the previously received virtual page addresses.

24. An apparatus comprising:

a processor;

a memory; and a subsystem controller coupled between the processor and the memory to receive a requests from the processor to access the memory at a virtual address that includes a virtual page address and a page offset, the subsystem controller including:

page hit logic to compare the virtual page address against a previously received virtual page address to determine if data from a row of memory cells that correspond to a previously received virtual page address is present in a sense amplifier bank of the memory; and address generation logic to assert an address to access a portion of the data if the data is indicated by the page hit logic to be present in a sense amplifier bank of the memory.

25. The apparatus of claim 24 wherein the apparatus further comprises a graphics subsystem and wherein the processor is part of the graphics subsystem.

26. The apparatus of claim 24 wherein the subsystem controller further comprises a translation buffer and translation logic to determine if a physical page address that corresponds to the row of memory cells is stored in the address translation buffer.

27. The method of claim 24 wherein the memory comprises a dynamic random access memory (DRAM) component having a plurality of sense amplifier banks, and wherein the page hit logic compares the virtual page address against contents of a plurality of page registers that each contain a respective previously received virtual page address to determine if data from a row of memory cells that correspond to one of the previously received virtual page addresses is present in one of the plurality of sense amplifier banks.

28. An apparatus comprising:

a graphics subsystem;

a memory; and a subsystem controller coupled to the graphics subsystem via an Accelerated Graphics Port and to the memory, the subsystem controller being configured to receive a requests from the graphics subsystem to access the memory at a virtual address that includes a virtual page address and a page offset, the subsystem controller including:

page hit logic to compare the virtual page address against a previously received virtual page address to determine if data from a row of memory cells that correspond to the previously received virtual page address is present in a sense amplifier bank of the memory; and address generation logic to assert an address to access a portion of the data if the data is indicated by the page hit logic to be present in a sense amplifier bank of the memory.

29. A method of accessing memory comprising:

receiving a virtual address to access target data associated with the virtual memory address;

comparing at least a portion of the virtual memory address with the content of one or more page registers, the content comprising at least portions of other virtual memory addresses associated with previously accessed data, the previously accessed data being present within sense amplifier banks of the memory; and if there is a match between the at least a portion of the virtual memory address and one of the at least portions of the other virtual memory addresses, accessing the target data within the sense amplifier banks.

* * * * *